W. F. KELLY.
LUBRICATOR.
APPLICATION FILED APR. 11, 1917.
1,235,812.
Patented Aug. 7, 1917.
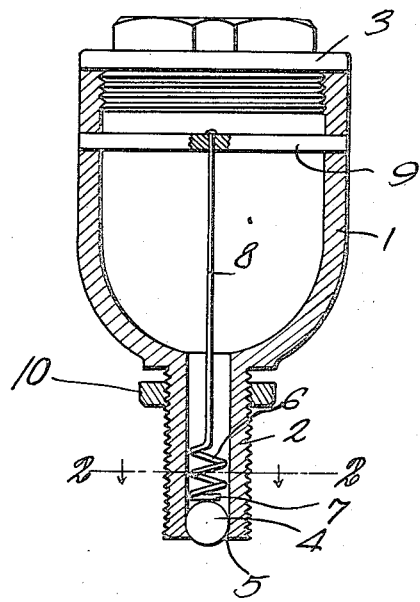
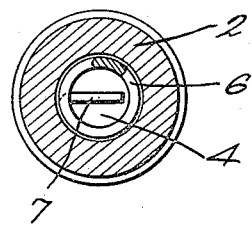
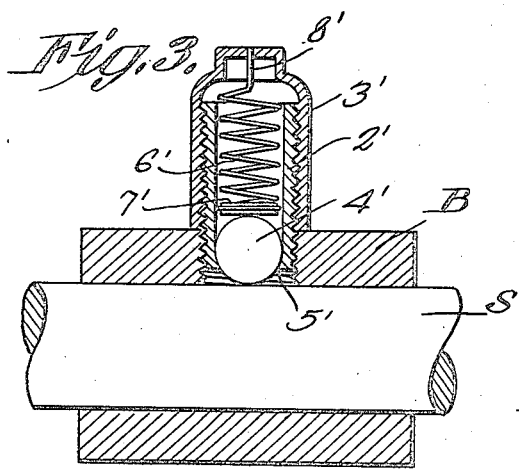
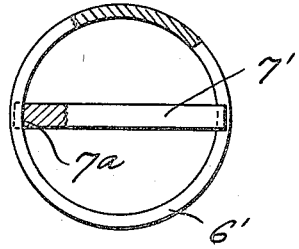
Inventor
W. F. Kelly,

UNITED STATES PATENT OFFICE.

WILLIAM F. KELLY, OF SYRACUSE, NEW YORK.

LUBRICATOR.

1,235,812.  Specification of Letters Patent.  Patented Aug. 7, 1917.

Application filed April 11, 1917. Serial No. 161,281.

*To all whom it may concern:*

Be it known that I, WILLIAM F. KELLY, a citizen of the United States, residing at Syracuse, in the county of Onondaga and State of New York, have invented a new and useful Lubricator, of which the following is a specification.

The present invention appertains to lubricators, and aims to provide a device of that character for lubricating bearings, shafts, and the like, and having novel means for controlling the flow of lubricant to the parts to be lubricated, in order to prevent the excessive flow of the lubricant.

It is also the object of the invention to provide a lubricator of the nature indicated which is extremely simple and inexpensive in construction, and thoroughly efficient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a median section of one form of lubricator, portions being shown in elevation.

Fig. 2 is an enlarged cross section on the line 2—2 of Fig. 1.

Fig. 3 is a median section of another form of the invention, portions being shown in elevation.

Fig. 4 is an enlarged sectional detail of the second form.

Fig. 5 is a perspective view of the pin of the second form carried by the spring to contact with the ball.

Referring to Figs. 1 and 2, the body of the lubricator is of funnel-shape, having the cup 1 and spout or nipple 2. The nipple 2 is adapted to be threadedly engaged within a bearing or the like for the flow of lubricant through the nipple to the shaft and bearing or other relatively movable parts. The mouth of the cup 1 is closed by a removable screw cap 3 or other suitable closure for holding the lubricant within the cup, the supply of lubricant being readily replenished from time to time by removing the cap 3. A ball 4 of metal or other suitable material is fitted snugly within the free end portion of the nipple 2, and said free end of the nipple is contracted to provide a concaved seat 5 for the ball 4, said ball extending slightly through the opening surrounded by the seat 5 or projecting from the end of the nipple to contact with the shaft or other relatively movable part.

A coiled wire expansion spring 6 is disposed within the nipple 2 for holding the ball 4 against or adjacent to the seat 5, to prevent the ball moving too far away from the seat 5 by the vibrations, centrifugal force, or other shocks or strains. That end of the spring 6 adjacent to the ball 4 is provided with a diametrical pin 7 which contacts between its ends with the ball 4 to provide a single point of contact between the spring and ball, and to transmit the tension of the spring to the ball in an effective manner. The other end of the spring 6 has a stem 8 extending longitudinally from the nipple 2 into the cup 1 and engaged with a diametrical pin or rod 9 engaged through the cup 1 and having its ends seated in the wall thereof. The spring 6 is thus anchored in place by means of the stem 8 and pin 9.

The ball 4 in contacting with the shaft or other relatively movable part is adapted to roll, whereby to carry a film of lubricant from within the nipple 2 to the shaft or other part. The lubricant is thus supplied slowly to the shaft or other movable part, but no excessive flow of the lubricant is possible, since the ball 4 is held adjacent to the seat 5 by the spring 6.

In the modification shown in Figs. 3, 4 and 5, a nipple or tubular member 2' is provided and is adapted to be threaded into the bearing B or other part, and the cap 3' is threaded upon the nipple 2' to close the same, and to bear against the bearing B, whereby the cap also serves as a lock for holding the nipple 2' in place. A ball 4' is movable snugly within the nipple 2' and is adapted to fit the concaved seat 5' provided by the contracted inner end of the nipple, said ball projecting from the inner end of the nipple to contact with the rotating shaft S.

A coiled wire expansion spring 6' is disposed within the nipple, and a pin 7' is disposed in a diametrical position within the inner convolution of the spring 6' and has notches 7ª in its ends in which the terminal convolution of the spring is seated, whereby to assemble said pin with the spring. The pin 7' bears between its ends against the ball 4', the same as does the pin 7 above described. The other end of the spring 6' has an outwardly projecting stem 8' engaged with the central portion of the cap 3'.

It is preferable, but not compulsory, to provide a lock nut 10 upon the nipple 2, to seat against the bearing or other part to which said nipple is applied, for holding the device in place, the cap 3' serving as a lock nut in the device shown in Fig. 3.

Having thus described the invention, what is claimed as new is:—

A lubricator embodying a nipple having a contracted end providing a valve seat, a ball rotatable within said nipple adjacent to said valve seat and projecting from said end of the nipple, and an expansion coil spring within the nipple having a diametrical pin at one end bearing against said ball to press it against the seat.

In testimony that I claim the foregoing as my own, I have hereto affixed my signature in the presence of two witnesses.

WILLIAM F. KELLY.

Witnesses:
ALBERT G. GRANT,
BERNARD MADDEN.